MAGNETIC CORE BINARY COUNTER SYSTEM

Filed Nov. 20, 1959

INVENTOR,
EUGENE W. SARD,
HARVEY SALZ.

BY Harry M. Saragovitz
ATTORNEY.

2,968,797

MAGNETIC CORE BINARY COUNTER SYSTEM

Eugene W. Sard, Flushing, N.Y., and Harvey Salz, Belleville, N.J., assignors to the United States of America as represented by the Secretary of the Army Filed Nov. 20, 1959, Ser. No. 854,524

7 Claims. (Cl. 340—174)

This invention relates to electrical circuits and more particularly to magnetic core-type binary counters.

Various magnetic core logic circuits have been proposed which utilize the substantially square hysteresis loops of the magnetic material of the core. Such circuits may be utilized to provide binary counter circuits which produce an output pulse for every two applied input pulses. It is a specific object of the present invention to provide an improved binary counter employing magnetic cores.

It is another object of the present invention to provide an improved magnetic core binary counter wherein the binary output is derived with a minimum of delay.

It is still another object of the present invention to provide an improved magnetic core binary counter wherein a single output is produced for two input pulses regardless of the time interval therebetween.

In accordance with the present invention there is provided a binary counter which includes at least four magnetic cores, each having two directions of magnetization, and a source of input pulses. Each of the magnetic cores are linked by a different one of a plurality of input windings and a different one of a plurality of output windings. The input windings respectively linking a first, second and third core are connected in series across the input pulse source and arranged such that the input winding of the first core links its respective core in a sense opposite to the sense that the second and third input windings link their respective cores. The sense of the input winding linking the first core is such that it responds to the input pulses as an inhibit winding. Included further are means in circuit with the output windings of the first and second cores and connected in series with the input winding linking the fourth core and the respective input windings of the first and second cores such that the sense of the respective input windings linking the fourth and second cores respond to output pulses from the output winding of the first and second cores as inhibit windings, and the sense of the respective input winding linking the first core is opposite to the sense of the inhibit windings associated with the fourth and second cores. In addition, there is included means connecting the output winding linking the third core and the input winding linking the fourth core whereby when a pulse derived from the output winding of the third core is applied to the input winding linking the fourth core, said fourth core is magnetized in a direction opposite to that caused by the inhibit action of the input winding linking the fourth core. Included further are a source of shift pulses and respective shift windings linking each of the four cores and in series connection with the shift pulse source.

For a better understanding of the invention, together with other and further objects thereof, reference is had to the following description taken in connection with the accompanying drawing in which.

Figure 1:
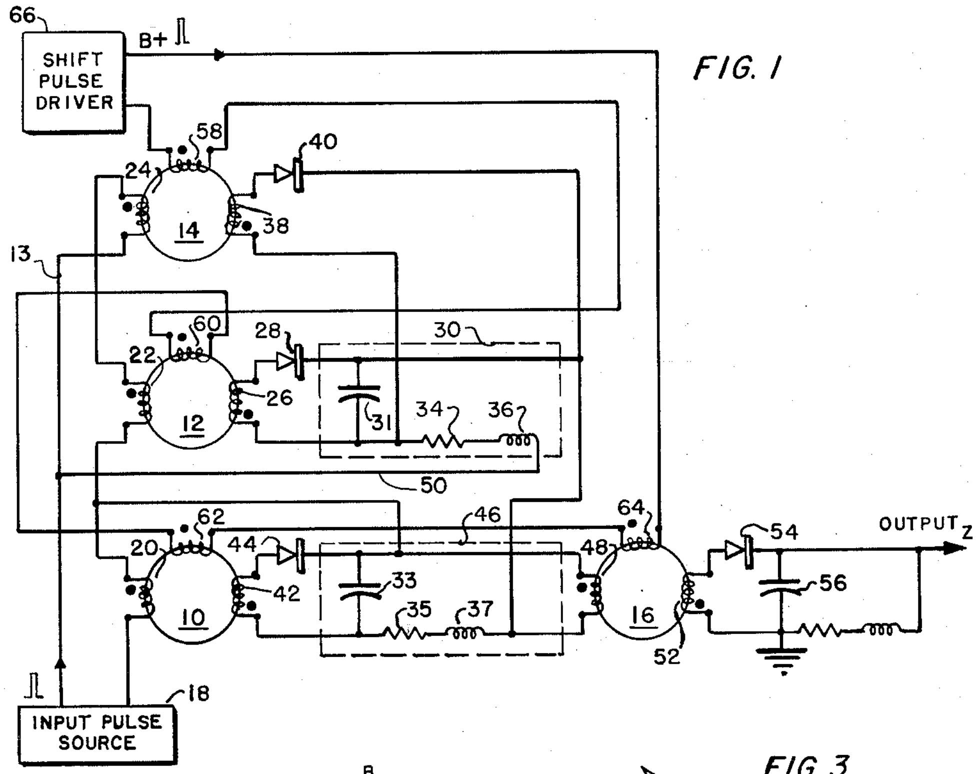
Fig. 1 is a schematic diagram of the magnetic-core binary counter embodying the invention.
Figure 2:
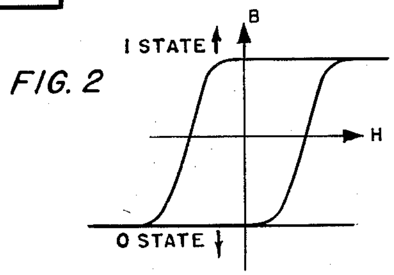
Fig. 2 is a graph of the hysteresis loop for the magnetic material utilized in the cores.

Referring now to Fig. 1 of the drawing, the binary counter circuit includes the cores 10, 12, 14, and 16, the core 16 being the output core. Each of the cores is fabricated from a magnetic material characterized by a substantially rectangular hysteresis loop as shown in Fig. 2. Each core has two remanent states or conditions of magnetic induction in which the core exhibits substantial flux saturation. One remanent condition, hereinafter referred to as the 1-state, corresponds to a flux substantially oriented in one direction, and the other remanent condition, hereinafter referred to as the 0-state, corresponds to a flux substantially oriented in an opposite direction. Hence, each core is capable of storing one binary digit in the form of its residual flux which may assume one of two directions. In Fig. 1, the relative sense of linkage of a winding to a core is indicated by a dot adjacent one of its terminals in accordance with the usual transformer convention. A dot is placed at one terminal of each winding on the core. The polarity of the voltage induced in any winding is the same as the polarity of the voltage applied to the winding which is causing the flux change, where the polarities are with respect to the dots at the respective windings. In the case of the driving or shifting pulse, the relatively positive potential is applied to a non-dot terminal, and the induced voltages in the other windings are in the opposite direction. This also applies to inhibit pulses. A change of flux in the core from the 1-state to the 0-state induces a voltage in each winding coupled thereto, the polarity of which is such that the marked terminal is negative relative to the unmarked terminal. For a change of flux in the core from the 0-state to the 1-state, the polarity of induced voltage is reversed.

Referring now again to Fig. 1, an input pulse source 18 is connected in series through lead conductor 13 to a pair of input windings 20 and 22 which are linked to the cores 10 and 12, respectively, and an inhibit winding 24 which links with core 14. An output winding 26 linking the core 12 is coupled through a diode 28 to a delay storage means 30. The diode 28 is poled to pass a positive current into the delay storage means 30. As shown, delay storage means 30 includes a resistor 34 and an inductance 36 connected in series with winding 26, diode 28, and conductor 13, and a temporary storage means such as capacitor 31 connected in shunt between the cathode of diode 28 and the junction of resistor 34 and one terminal of output winding 26. The operation of this type of delay storage is well known and is fully described in an article entitled "Magnetic Shift Register Using One Core Per Bit" by Kodis, Ruhman and Woo in part 7 of the IRE Convention Record, 1953. An output winding 38 linking the core 14 and a diode 40 poled to pass a positive current are connected in series across capacitor 31. With this arrangement, positive current may be passed into delay storage means 30 through either diode 28 or diode 40. An output winding 42 linking the core 10 is coupled through a diode 44 to a delay storage means 46 identical in construction to the delay storage means 30 hereinabove described. Delay storage means 46 includes a storage capacitor 33 and series connected resistor 35 and inductance 37. The diode 44 is poled to pass a positive current into the delay storage means 46, the output of which is connected in series with an input winding 48 linking core 16. As shown, the output of delay storage means 30 is connected in series with input windings 48, 22, and 24 of respective cores 16, 12, and 14. This series connection is arranged so that for any output derived from delay storage means 30, the input windings 48 and 22 act as inhibit windings linking cores 16 and 12, respectively, and winding 24 linking core 14 acts as a feedback input winding. An output winding 52 linking the core 16 is coupled through a diode 54 poled to pass positive current to output capacitor 56 connected between the cathode of diode 54 and ground. With the arrangement hereinabove described, it can be seen that an input positive pulse from source 18 will be applied as an inhibit signal to winding 24 linked to core 14 and as input signals to windings 20 and 22 linking cores 10 and 12, respectively; the output from delay storage means 30 will be applied as inhibit signals to windings 48 and 22 linking cores 16 and 12, respectively, and as an input feedback signal to winding 24 linked to core 14; and the output from delay storage means 46 will be applied as an input signal to winding 48 linked to core 16.

Linked to each of the cores are respective shift windings 58, 60, 62, and 64 which are arranged in series as in a "single-line" shift register. A source of current pulses referred to as a shift or readout pulse is applied to the shift line by means of a conventional shift pulse driver 66. The input and shift pulses are each arranged to furnish current pulses to one polarity, in this example positive with reference to the ground potential, to the respectively coupled windings.

Figure 3:
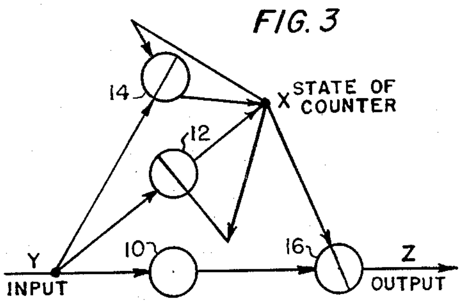
Fig. 3 is a symbolic or functional circuit arrangement of the schematic circuit illustrated in Fig. 1.

In order to better understand the operation of the counter, reference is made to the functional schematic representation illustrated in Fig. 3. The symbolic circuit arrangement shown in Fig. 3 is in accordance with that shown in an article entitled "Circuits to Perform Logical and Control Functions With Magnetic Cores" published by Guterman, Kodis, and Ruhman in part 4 of the IRE Convention Record, 1954. It is to be noted that although the shift line is not shown, a common shift source is assumed. In Fig. 3, Y represents the input to the counter, X the state of the counter stage, i.e., the output of delay storage means 30, and Z represents the output of the counter (the carry). If $X_n$ represents the state of the counter stage at the $n$th shift pulses and $X_{n+1}$ represents the state of the counter stage after one shift pulse has passed, then the following truth table will be applicable to the counter:

| $Y_n$ | $X_n$ | $X_{n+1}$ | $Z_{n+2}$ |
|---|---|---|---|
| 0 | 0 | 0 | 0 |
| 0 | 1 | 1 | 0 |
| 1 | 0 | 1 | 0 |
| 1 | 1 | 0 | 1 |

From the truth table it can be seen that the following equations hold true:

$$X_{n+1}=X_n\bar{Y}_n+\bar{X}_nY_n \quad (1)$$

and $$Z_{n+2}=Y_n\bar{X}_{n+1}=X_nY_n \quad (2)$$

Figure 4:
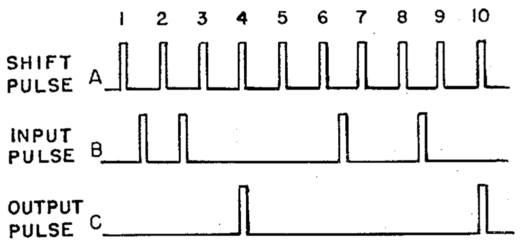
Fig. 4 shows a sequence of pulses to explain the operation of the circuit of Fig. 1.

Now, let it be assumed that respective input pulses are applied after the first and second shift pulses and also after the sixth and eighth shift pulse as shown in Fig. 4B. Each input pulse from the input pulse source 18 is applied during the time interval when the charged capacitors of the delay storage means 30 and 46 are discharging. The correct timing of the input pulses may be achieved by known synchronizing means (not shown) connected between the shift and input pulse sources. Also, as is conventional, the shift pulse from driver 66 is applied to each shift winding with the positive potential applied to the non-dot terminal as shown, so that the cores are then driven to saturation in the 0-state. Upon termination of the first shift pulse, each core is then magnetized in the 0-state. Now, assuming a first positive current input pulse applied from input pulse source 18 after the first shift pulse, then the current flow in winding 24 (inhibit action) drives core 14 further into saturation in the 0-state while the current in the windings 20 and 22 drives the respective cores 10 and 12 from the 0-state to the 1-state. The core 14 thus remains magnetized in the 0-state. The flux change in the cores 10 and 12 induce respective voltages in the output windings 42 and 26 which is blocked by the respective diodes 44 and 28. Upon the application of the second shift pulse, core 14 remains saturated in the 0-state while the flux in cores 10 and 12 change from the 1-state to the 0-state. This flux change in cores 10 and 12 induce voltages in respective output windings 42 and 26 such that current flows through respective diodes 44 and 28 to charge the respective capacitors of delay storage means 46 and 30. When the shift pulse is ended, each of the delay storage means capacitors begin to discharge. As can be seen, the current from the capacitors 31 and 33 flows through winding 48 of core 16 in opposite directions so that no flux change is produced in core 16. While the capacitors are discharging, the second input pulse is applied as an inhibit pulse to winding 24 of core 14 and as input pulses to windings 22 and 20 of respective cores 12 and 10. The discharge of capacitor 31 provides an inhibit pulse to winding 22 and an input feedback signal to winding 24. Hence cores 14 and 12 remain in the 0-state while core 10 is driven to the 1-state. The flux change in core 10 induces a voltage in the output winding 42 which is blocked by diode 44. Core 16, of course, remains in the 0-state. Upon the application of the third shift pulse, core 10 is driven from the 1-state to the 0-state and the flux change in core 10 induces a voltage in the output winding 42 such that current flows in diode 44 to charge storage capacitor 33. At the end of the third shift pulse, the positive pulse from capacitor 33 will discharge through input winding 48 of core 16 to drive core 16 from the 0-state to the 1-state. The flux change in core 16 induces a voltage in the output winding 52 which is blocked by the diode 54. After the fourth shift pulse, cores 14, 12, and 10 remain in the 0-state while core 16 is driven from the 1-state to the 0-state. As a result, the flux change in core 16 induces a voltage in the output winding 52 which is such that diode 54 conducts to charge output capacitor 56. Thus after the fourth shift pulse, an output is derived from the counter stage.

For the fifth and sixth shift pulses, all the cores are maintained in the 0-state. Assuming now another input pulse from source 18 applied after the sixth shift pulse, then an inhibit pulse will be applied to winding 24 of core 14 to maintain this core in the 0-state, but cores 12 and 10 will be driven to the 1-state as hereinabove described. The respective flux changes in cores 12 and 10 induce output voltages in respective output windings 26 and 42 which are blocked by respective diodes 28 and 44. Upon the application of the seventh shift pulse, core 14 is maintained in the 0-state while cores 12 and 10 are driven respectively from the 1-state to the 0-state. The flux change in cores 12 and 10 induces voltages in respective output windings 26 and 42 such that current flows through respective diodes 28 and 44 to charge delay storage means 30 and 46. At the end of the seventh shift pulse, the opposite discharge paths from capacitors 31 and 33 through input winding 48 of core 16 will maintain core 16 in the 0-state. Core 12 will also be maintained in the 0-state and core 14 will be driven to the 1-state by the discharge current applied therethrough from capacitor 31 of delay storage means 30. Upon the application of the eighth shift pulse, core 14 will be driven to the 0-state and the flux change therein induces a voltage in the output winding 38 thereof such that current flows through diode 40 to charge capacitor 31 in delay storage means 30. At the termination of the eighth shift pulse, another input pulse is applied from source 18. The discharge of capacitor 31 will inhibit core 12 from being driven to the 1-state and the input pulse applied to winding 24 of core 14 will inhibit the feedback input pulse from capacitor 31 so that core 14 will be maintained in the 0-state. Core 16 will be maintained in the 0-state due to the discharge of capacitor 31 through winding 48. However, core 10 will be driven to the 1-state and the change in flux in core 10 induces a voltage in output winding 42 thereof which is blocked by diode 44. The ninth shift pulse will drive core 10 to the 0-state. This flux change induces a voltage in the output winding 42 of core 10 such that diode 44 conducts to charge capacitor 33 in delay storage means 46. The discharge of capacitor 33 through winding 48 will drive core 16 to the 1-state. The flux change in core 16 induces a voltage which is blocked by diode 54. After the tenth shift pulse, an output is derived from core 16 as hereinabove explained. Thus, for any two input pulses, a single pulse is derived from the counter stage. It is to be noted that the input pulses may be aperiodic as well as periodic.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A binary counter comprising, at least four magnetic cores, each of said cores being capable of assuming either of two stable states of magnetic remanence, a source of input pulses, each of said magnetic cores being linked by a different one of a plurality of input windings and a different one of a plurality of output windings, the input windings respectively linking a first, second and third of said cores being connected in series with the output of said input source, the input winding of said first core being linked to its respective core in a sense opposite to the sense that the second and third input windings link their respective cores such that the first core input winding responds to the input pulses as an inhibit winding, means in circuit with the output windings of said first and second cores and connected in series with the input winding linking said fourth core and the respective input windings of said second and first cores such that the sense of the respective input windings linking said fourth and second cores responds to output pulses from the output windings of said first and second cores as inhibit windings, and the sense of the respective input winding linking said first core is opposite to the sense of the inhibit windings associated with said fourth and second cores, and means connecting the output winding linking said third core and the input winding linking said fourth core whereby when a pulse derived from the output winding of the third core is applied to the input winding linking said fourth core, said fourth core assumes a state of magnetic remanence opposite to that caused by the inhibit action of said input winding linking said fourth core.

2. The binary counter in accordance with claim 1 and further including a source of shift pulses, and respective shift windings linking each of said four cores and in series connection with said shift pulse source.

3. A binary counter comprising at least four magnetic cores, each of said cores being capable of assuming either of two stable states of magnetic remanence, a source of input pulses, each of said magnetic cores being linked by a different one of a plurality of input windings and a different one of a plurality of output windings, the input windings respectively linking a first, second and third of said cores being connected in series across the output of said input pulse source, the input winding of said first core being linked to its respective core in a sense opposite to the sense that the second and third input windings link their respective cores such that the first core input winding responds to the input pulses as an inhibit winding, a delay storage means in circuit with the output windings of said first and second cores and having its output in series connection with the input winding linking said fourth core and the respective input windings of said second and first cores such that the sense of the respective input windings linking said fourth and second cores responds to outputs derived from the output winding linking said first and second cores as inhibit windings, and the sense of the respective input winding linking said first core is opposite to the sense of the inhibit windings associated with said fourth and second cores, and means connecting the output winding of said third core and the input winding of said fourth core whereby the output from the third core output winding causes said fourth core to assume a state of magnetic remanence opposite to that caused by the inhibit action of the input winding linking said fourth core.

4. The binary counter in accordance with claim 3 wherein said last mentioned means comprises a delay storage means.

5. A binary counter comprising at least four magnetic cores, each of said cores being capable of assuming either of two stable states of magnetic remanence, a source of input pulses, three input windings respectively linking three of said cores and connected in series with the output of said input source, the first and second of said windings linking their respective first and second cores in one sense, the third of said windings linking its respective core in a sense opposite to said one sense such that the third of said windings responds to said input pulses as an inhibit winding, a fourth input winding linking said fourth core, a first delay storage means connecting the output winding of the first core to said fourth input winding, a second delay storage means connected in common across the output winding of the second core and the output winding of the third core, the output of said second delay storage means being connected in series arrangement with said fourth input winding, said second input winding and said third input wnidng such that the fourth input winding and the second input winding respond to the output of said delay storage means as an inhibit winding and the third input winding responds to the output of said second delay storage means as a feedback winding, a source of shift pulses, and respective shift windings linking each of said four cores and in series connection with said shift pulse source.

6. A binary counter comprising at least four magnetic cores, each of said cores being capable of assuming either of two stable states of magnetic remanence, a source of input pulses, each of said magnetic cores being linked by a different one of a plurality of input windings and a different one of a plurality of output windings, the input windings respectively linking a first, second and third of said cores being connected in series with the output of said input source, the input winding of said first core being linked to its respective cores in a sense opposite to the sense that the second and third input windings link their respective cores such that the first core input winding responds to the pulses from said source as an inhibit winding, a first and second delay storage means, said first delay storage means being responsive to the outputs derived from the output windings linking said first and second cores and having its output connected in series with the input winding linking said fourth cores and the respective input winding of said second and first cores such that the sense of the respective input windings linking said fourth and second cores respond to pulses from the output windings of said first and second cores as inhibit windings, and the sense of the respective input winding linking said first core is opposite to the sense of the inhibit windings associated with said fourth and second cores, said second delay storage means connecting the output winding linking the third core and the input winding linking the fourth core in a manner such that the output derived from the third core output winding causes said fourth core to assume a state of magnetic remanence opposite to that caused by the pulses applied to the input winding of said fourth core through said first delay storage means, a source of shift pulses, and respective shift windings linking each of said four cores and in series connection with the shift pulse source.

7. The system in accordance with claim 5 wherein said second delay storage means is connected to the output winding linking said third core through a first diode poled to pass a positive current, and wherein said first delay storage means is connected to the output windings linking said first and second cores through respective second and third diodes each poled to pass positive current.

References Cited in the file of this patent

UNITED STATES PATENTS

| | | |
|---|---|---|
| 2,742,632 | Whitely | Apr. 17, 1956 |
| 2,935,735 | Kodis | May 3, 1960 |